United States Patent [19]
Nelson

[11] Patent Number: 5,925,437
[45] Date of Patent: Jul. 20, 1999

[54] SEE-THROUGH PANEL ASSEMBLY WITH RETROREFLECTIVE SURFACE AND METHOD OF MAKING SAME

[76] Inventor: Stephen G. Nelson, 4828 N. 31 St., Phoenix, Ariz.

[21] Appl. No.: 08/956,570

[22] Filed: Oct. 23, 1997

[51] Int. Cl.⁶ .................... B32B 3/10; B28B 1/48
[52] U.S. Cl. .............. 428/137; 428/41.8; 428/42.1; 428/195; 428/204; 428/207; 428/913.3; 156/252; 156/277; 264/156; 264/241; 359/529; 359/591; 40/442
[58] Field of Search ..................... 428/137, 138, 428/172, 41.8, 42.1, 195, 201, 203, 204, 207, 913, 913.3, 918; 156/60, 252, 277, 290; 264/154, 155, 156, 241; 359/529, 591, 592, 601; 40/442, 446, 582

[56] References Cited

U.S. PATENT DOCUMENTS 4,673,609  6/1987  Hill ......................... 428/187
5,609,938  3/1997  Shields ...................... 428/138

Primary Examiner—Donald Loney
Attorney, Agent, or Firm—Gregory J. Nelson

[57] ABSTRACT

A one-way see-through panel assembly enhanced by a retroreflective surface. The panel assembly has a first panel which has a dark light-absorbing surface and an opposite light reflecting surface. A retroreflective sheet is applied over the light reflecting surface to form an assembly. Light passageways, either perforations or a pattern of discrete transparent areas, are provided in the assembly. An image is imprinted on either the surface of the retroreflective panel or the light reflecting surface. The method includes mechanically perforating the assembly which is facilitated by the retroreflective sheet having non-glass reflective formations thereon.

13 Claims, 2 Drawing Sheets

SEE-THROUGH PANEL ASSEMBLY WITH RETROREFLECTIVE SURFACE AND METHOD OF MAKING SAME

FIELD OF THE INVENTION

The present invention relates to an image-bearing panel assembly having one-way visibility in which the image is apparent when viewed in one direction and providing see-through visibility in the other direction and further having a retroreflective image surface.

BACKGROUND OF THE INVENTION

One-way, see-through panels are currently used in advertising, point of sale displays and other applications. Generally the panels are formed having an image which is viewable in one direction. The panels are perforated so that the perforations allow substantially unobstructed viewing through the panel in the opposite viewing direction. Common applications are advertising messages applied to the entire exterior surface of a bus so that viewers located exteriorly of the bus will be able to view the message or advertising image. Passengers within the bus have a substantially unobstructed view looking outwardly through the bus window.

Other typical applications are advertising applications such as store front windows, billboards or other transparent surfaces such as refrigerator case doors.

Typically, one-way panels are fabricated from a plastic film such as vinyl which carries a printed image and is visible when viewed from one direction and which appears substantially transparent when viewed from the opposite direction. The film has an opaque and a light-reflecting surface or coating.

U.K. Patent Application No. GB2118096 and U.S. Pat. No. 4,673,609 disclose similar one-way vision display panels which are fabricated from a substrate which comprises transparent, plastic sheets which are adhesively joined and which have a display image at the interface of two transparent panels of the assembly. In the panels of the above patent publications, the display image is visible when the panel assembly is viewed from one direction but is not seen when viewed from the opposite direction. In both instances, the display image is formed as pattern of opaque dots which are applied by screen, litho or a similar printing process to the panel interface. The opaque dots appear white or light in color on one side and black on the other. Light incident on the light colored side of the panel is scattered and reflected, thereby permitting an image formed by the dot pattern to be seen when viewed from this direction. Light incident on the opposite or black side of the panel is absorbed, such as the light is transmitted through the transparent portions of the panel permitting through-viewing in this direction.

It is also known to fabricate one-way vision display panels from metalized plastic film that is screen printed on one side and perforated with an ordered pattern of holes. The perforated, metalized film is then applied to the exterior surface of a window using either a double-sided tape or a spray adhesive.

U.S. Pat. No. 5,609,938 discloses one or more panels which define a support for an image layer and a relatively dark layer. Perforations extend through the panel and the layer. The perforations allow viewing through the panels in one direction without seeing the image yet the image can be viewed by looking through the panel assembly from the opposite.

Thus, the one-way, through-viewing effect can be achieved by a substrate which is either perforated or to which is applied a specific dot pattern or other pattern. For example, U.S. Pat. Nos. 4,925,705 and 4,673,609 disclose printed application of a dot or other patterns to achieve one-way visibility.

In addition, retroreflective material has been commonly employed for various safety, decorative and advertising purposes. Minnesota Mining and Manufacturing Company sells a product which is designated "Scotch Lite" and which relies upon small glass spheres embedded in a matrix of synthetic resin to provide retroreflectability. It would be desirable to provide one-way see-through substrates or image display panels as described above with retroreflectivity. However, there are inherent difficulties in doing this, particularly utilizing conventional retroreflective materials such as minute glass beads. As mentioned above, one-way panels are conventionally produced by perforating the laminate structure to provide holes or apertures which allow light passage so that substantial visibility and see-through capability is provided in one direction. Minute glass spheres embedded in the matrix of resin provide retroreflectivity but the application of such material to a one-way panel has problems in the perforation of the panels. Glass beads cannot be conventionally perforated by mechanical means as they will fracture. Further, glass beads are too abrasive for conventional tool and die perforating equipment.

Accordingly, to perforate a substrate of vinyl, plastic or other material which has one-way capability to which has been applied a material such as that sold under the trademark Scotch Lite requires complex and expensive perforation procedures. At present, the most practical way of perforating such a material is by means of laser which is expensive in first cost and expensive in operation and generally slow in operation. Laser perforating of material involves the use of a laser which has sufficient intensity to cut through the material and which are controlled by computers coupled to a servo motor. U.S. Pat. No. 5,550,346 discloses an apparatus of this type.

Accordingly, the present invention provides a one-way panel to which can be applied retroreflective surface over all or part of the panel and which panel can be perforated by conventional mechanical perforating means without the need or requirement of expensive computers or controlled servo lasers.

SUMMARY OF THE INVENTION

The present invention provides an improved one-way vision panel assembly comprising a plurality of panels which are bonded together wherein one of the panels carries an image which can be viewed when looking in one direction through the panel but which is not apparent when viewing in the opposite direction. The viewed surface is enhanced by being retroreflective so that light rays impinging on the surface are reflected toward the source of illumination. This creates increased conspicuity as well as improves usefulness in low light conditions.

The assembly is suitable for mounting on displays such as transparent surfaces such as windows, doors and the like. A first surface of a flexible substrate is provided with a light-reflecting coating and the opposite surface is provided with a light-absorbing dark opaque coating. At least a portion of the first surface has retroreflective characteristics which is achieved by applying retroreflective sheeting material over at least a portion of the surface of the substrate. The retroreflective sheeting consists of reflectors or light-reflecting microprisms fabricated from suitable plastic resins such as polyurethane, PVC, polycarbons, acrylics and the like. Material of this type is sold under the trademark REFLEXITE® manufactured by Reflexite Corporation of New Britain, Ct. Once applied to the substrate, the retroreflective assembly may then be imprinted with an image and perforated so that the resulting structure has both one-way, see-through capability and also retroreflective capability.

The image is applied either prior to perforating or after perforating by litho, ink jet, laser jet, electrostatic, screen printing or other techniques. Normally perforation prior to printing is preferred as the assembly may be inventoried for application of an image at a later time. Preferably translucent, UV-resistant inks such as those manufactured by Minnesota Mining and Manufacturing are used.

The above and other objects and advantages of the present invention will become more apparent from the following description, claims and drawings in which:

Figure 1:
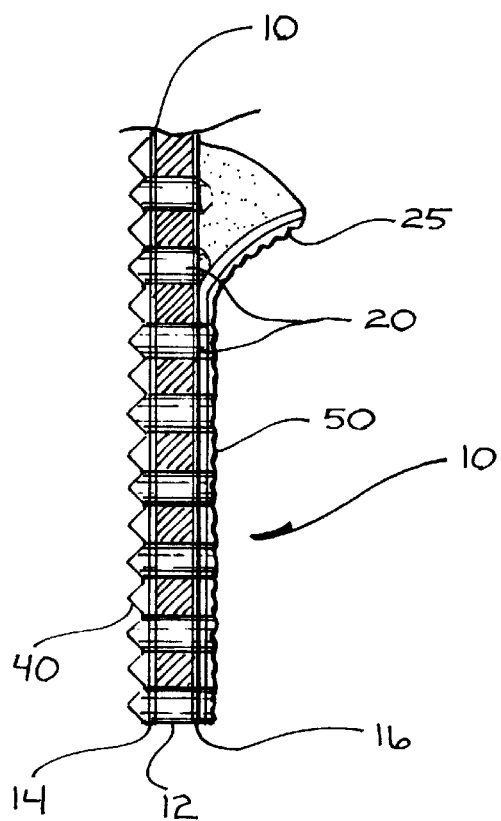
FIG. 1 is a cross-sectional view of the one-way vision display panel assembly of the present invention.
Figure 2:
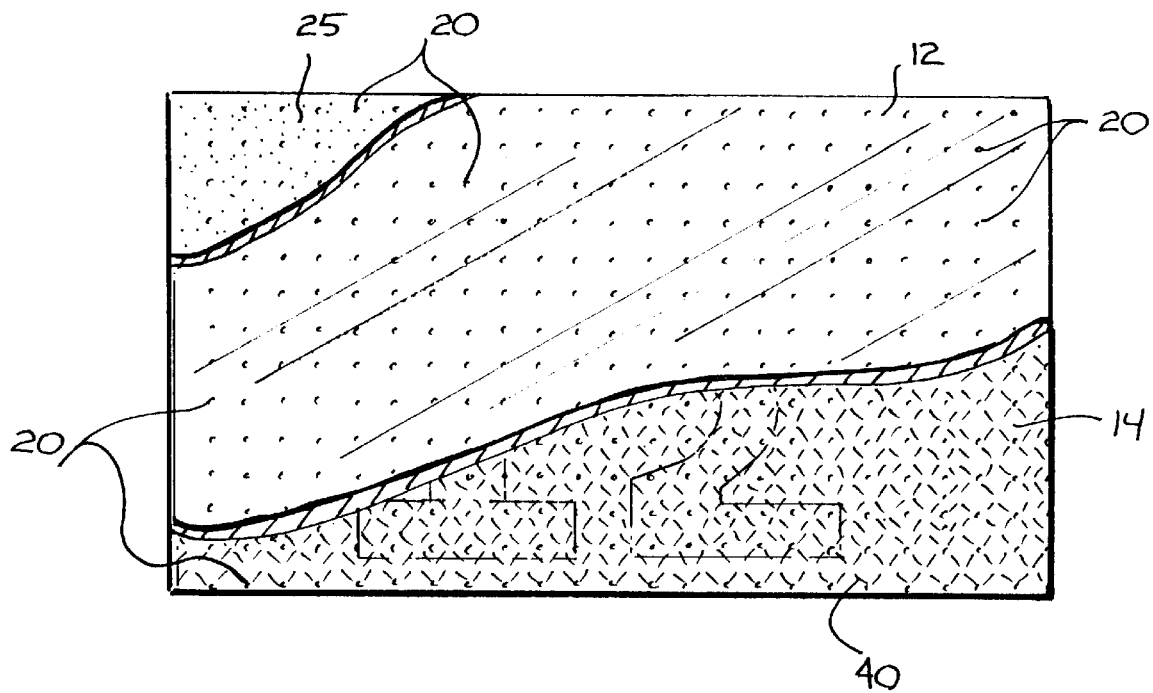
FIG. 2 is a front view of the panel assembly of the present invention partly broken away to better show the various layers of the substrate.
Figure 3:
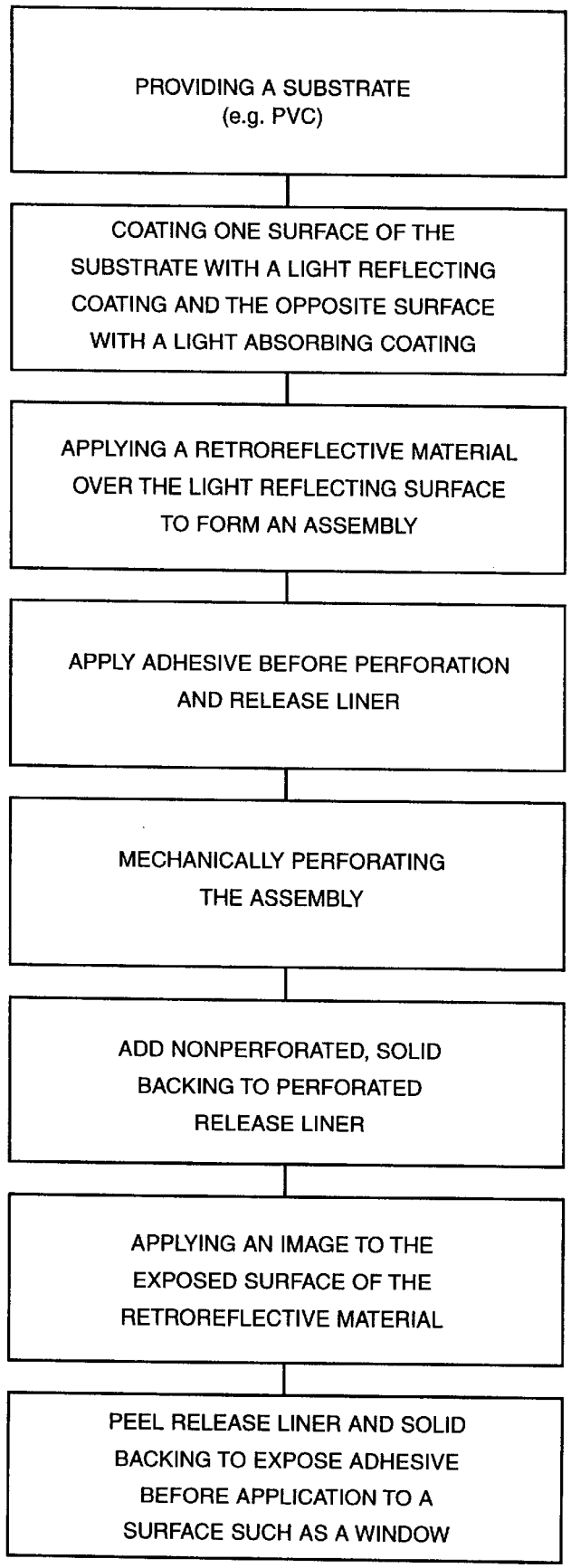
FIG. 3 is a block diagram illustrating the method and fabrication of the image bearing panel assembly in accordance with the present invention.

A one-way vision panel display assembly fabricated in accordance with the present invention is generally designated by the numeral 10 and is shown in FIGS. 1 and 2.

The display panel assembly 10 includes a first substrate or panel 12 and a second panel 14. Panel 12 is preferably a relatively thin, flexible sheet or film-like substrate material such as polyvinyl chloride. The panels 12 and 14 may be bonded together by suitable bonding process or adhesive such as a clear adhesive or by heat lamination to form a composite substrate. Panel 14 is a sheet of retroreflective material of the type which has a surface defining a plurality of reflective formations as taught by U.S. Pat. No. 3,684,348. Preferably, the reflective formations are microprisms formed from a transparent material such as an acrylic resin. Material of this type is available under the trademark "Reflexite".

Panel 12 has an opaque, light-absorbing dark coating 16 on one side such as a coating of black pigment. The dark coating covers the entire surface of the panel 12. The opposite surface 18 is coated with a light color so as to be light reflective. The assembly is perforated with a plurality of spaced-apart holes or apertures 20. The holes typically are 1/16" diameter and spaced on 3/32" center and are aligned to form a continuous light passage area. Preferably the openings comprise from about 30% of the area of the panels to about 50%. The surface 16 may be provided with a nonperforated, transparent release liner 25 covering and protecting the coating 16. The release liner 25 and backing 50 are removed at the time of application so that the entire panel can be easily and adhesively applied to a transparent surface such as a window. The release liner 25 may be perforated or may be applied after perforation. If the liner 25 is nonperforated, a continuous backing 50 may be applied over the release liner to prevent spray-through of ink.

The retroreflective sheet 14 consists of reflective formations 40 on a base sheet. The base sheet is of the type having minute cubed corner formations and is clear synthetic resin. Details concerning the manufacture and structure of the retroreflective assembly of this type may be found in U.S. Pat. No. 3,684,348, granted Aug. 15, 1972 and U.S. Pat. No. 3,689,346 which are incorporated herein by reference.

Other types of retroreflective sheet assemblies are known which have micro-reflective formations on a surface.

Once the assembly is fabricated as described above, the exposed surface of retroreflective panel 14 may be printed by laser, ink jet, screening, litho, electrostatic or other printing techniques. Preferably, translucent, UV-resistant inks are used suitable for outdoor use. Further, the use of translucent ink increases the retroreflective effect allowing light to pass through the applied image in both directions. Ink jet printing is particularly effective but requires the surface of sheet 14 be first coated with an ink jet compatible polymer and facilitate absorption of ink sprayed onto its surface.

Perforation occurs by subjecting the assembly to perforating mechanically by using a flat plate having perforating projections at spaced-apart locations or by using a rotary drum with suitable perforating projections. The material is brought into contact with the perforating apparatus and perforations in the pattern as described above are applied through the assembly. Perforations extend through panels 12 and 14 so that complete see-through visibility is provided from the rear surface.

EXAMPLE I

A vinyl approximately 4 to 8 mils thick is coated on one side with a black coating such as black, pigmented acrylic adhesive. The opposite side is coated with a white pigment. A sheet of retroreflective material of the type sold under the trademark REFLEXITE® is adhesively applied over the white surface of the panel with a clear acrylic adhesive. A release liner is applied to the dark opaque surface of the vinyl. The assembly is perforated by means of a rotary drum. After perforating, an image is applied by ink jet printing after application of an ink absorbing polymer to the retroreflective surface using a translucent ink. Preferably a continuous backing is applied over the perforated release liner prior to printing to prevent spray through and bleeding of the ink. The assembly is ready for convenient application to a transparent surface such as a window.

EXAMPLE II

An assembly may be prepared as described in Example I with the exception that the image is applied directly to the white pigment coated surface 18 of the vinyl substrate prior to applying the retroreflective film thereto. After application of the retroreflective panel 14, the assembly, including a release liner 25, is perforated.

It is noted that the panel 12 can also be formed by bonding a dark and light colored substrate together.

EXAMPLE III

An assembly is fabricated by first preparing a clear vinyl substrate according to the teachings of U.S. Pat. Nos. 4,925,705 and 4,673,609. The vinyl substrate is provided one-way see-through visibility by masking and flood coating with first black and then white pigment. When rinsed, a dot matrix pattern of light passageways is left defining light passageways providing the one-way visibility. A retroreflective panel 14 of the type having microprism formations thereon is bonded to the light-reflecting surface 18. An image is applied to the retroreflective film by an ink jet or other printing process.

The advantages of the invention reside in the provision of an assembly which is relatively inexpensive to manufacture and which is highly visible and attractive, particularly in low light conditions. The microprisms gather and reflect light to enhance the image. The one-way visibility facilitates application to windows where visibility is required for convenience and safety.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A one-way vision panel assembly comprising:
   (a) a panel having first and second surfaces, said first surface being dark opaque light-absorbing and said second surface being light reflective;
   (b) a retroreflective sheet material over at least a portion of said second surface of said panel, said sheet material being a synthetic material having reflective formations therein; and
   (c) light passageways extending through at least portions of the panel to provide one-way vision through the panel.

2. The panel assembly of claim 1 wherein an image is applied to said sheet material by a printing process selected from the group consisting of lithography, electrostatic printing, silkscreening, ink jet printing or laser jet printing.

3. The panel assembly of claim 1 wherein said light passageways comprise a pattern of perforations extending through said panel and said retroreflective sheet material.

4. The panel assembly of claim 1 further including a perforated release liner applied over said dark light absorbing opaque surface.

5. The panel assembly of claim 2 wherein said image is applied by using transparent inks.

6. The panel assembly of claim 4 including a continuous backing applied over said release liner.

7. The panel assembly of claim 1 wherein said reflective formations are microprisms.

8. A method of fabricating a one-way see-through panel assembly comprising:
   (a) providing a first panel having opposite first and second surfaces, said first surface being light absorbing and said second surface being light reflective;
   (b) applying a substantially transparent retroreflective synthetic material over at least a portion of said second surface to form an assembly with an exposed surface; and
   (c) mechanically perforating at least a portion of said assembly.

9. The method of claim 8 further including applying an image to the exposed retroreflective material.

10. The method of claim 9 wherein said image is applied by a printing process selected from the group consisting of ink jet printing, electrostatic printing, silk screening, lithography or laser printing.

11. The method of claim 9 wherein said image is applied using a UV resistant translucent ink.

12. The method of claim 8 wherein said retroreflective material has microprisms formed therein.

13. The method of claim 8 wherein said perforating is by a perforating press.

* * * * *